(12) United States Patent
Watanabe et al.

(10) Patent No.: US 8,171,899 B2
(45) Date of Patent: May 8, 2012

(54) LINK TYPE VARIABLE STROKE ENGINE

(75) Inventors: Sei Watanabe, Wako (JP); Shohei Kono, Wako (JP); Gaku Naoe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 458 days.

(21) Appl. No.: 12/464,499

(22) Filed: May 12, 2009

(65) Prior Publication Data
US 2009/0288641 A1  Nov. 26, 2009

(30) Foreign Application Priority Data
May 13, 2008  (JP) .................................. 2008-126209

(51) Int. Cl.
*F02B 75/04* (2006.01)
(52) U.S. Cl. ................ 123/48 B; 123/48 R; 123/78 BA; 123/78 E; 123/78 F; 123/197.4; 123/197.3
(58) Field of Classification Search ................ 123/48 A, 123/48 AA, 48 B, 48 R, 78 A, 78 B, 78 E, 123/78 F, 78 BA, 197.2, 197.4, 197.3
See application file for complete search history.

(56) References Cited

U.S. PATENT DOCUMENTS

| | | | |
|---|---|---|---|
| 2,314,789 A | 3/1943 | Jacobsen | |
| 4,270,495 A | 6/1981 | Freudenstein et al. | |
| 4,422,414 A * | 12/1983 | Moeller | 123/48 B |
| 4,517,931 A * | 5/1985 | Nelson | 123/48 B |
| 4,741,303 A * | 5/1988 | Kronich | 123/192.2 |
| 4,974,554 A * | 12/1990 | Emery | 123/48 B |
| 5,065,644 A * | 11/1991 | Shimada | 74/603 |
| 6,167,851 B1 * | 1/2001 | Bowling | 123/48 B |
| 6,510,821 B2 * | 1/2003 | Fujimoto et al. | 123/48 B |
| 7,185,615 B2 * | 3/2007 | Sato et al. | 123/48 B |
| 7,357,111 B2 * | 4/2008 | Maezuru et al. | 123/196 R |
| 2002/0020369 A1 * | 2/2002 | Uneta | 123/73 B |
| 2002/0043228 A1 * | 4/2002 | Moteki | 123/78 E |
| 2005/0016488 A1 * | 1/2005 | Kawakubo et al. | 123/192.2 |
| 2006/0081211 A1 * | 4/2006 | Genter | 123/197.3 |

FOREIGN PATENT DOCUMENTS

| | | |
|---|---|---|
| JP | 57-32267 Y2 | 7/1982 |
| JP | 9-228858 A | 9/1997 |
| JP | 2002-227612 A | 8/2002 |
| JP | 2006-144615 A | 6/2006 |
| JP | 2007-064013 A | 3/2007 |

OTHER PUBLICATIONS

European Search Report date Jul. 30, 2009, issued in corresponding European Patent Application No. 09160111.
Japanese Office Action dated Nov. 22, 2011, issued in corresponding Japanese Patent Application No. 2008-126209.

* cited by examiner

*Primary Examiner* — Noah Kamen
*Assistant Examiner* — Long T Tran
(74) *Attorney, Agent, or Firm* — Westerman, Hattori, Daniels & Adrian, LLP

(57) ABSTRACT

In a link type variable stroke engine in which a piston, a crankshaft and an eccentric shaft are linked by a linking mechanism, a counterweight part which is provided so that in a projection view on a plane orthogonal to an axis of a rotary shaft, a center of gravity of the counterweight part is located on an opposite side of the axis of the rotary shaft from an axis of the eccentric shaft rotates together with the rotary shaft. Accordingly, it is possible to effectively suppress and lessen half-order inertial exciting force occurring at the eccentric shaft.

3 Claims, 4 Drawing Sheets

LINK TYPE VARIABLE STROKE ENGINE

BACKGROUND OF THE INVENTION

1. Field of the Invention

The present invention relates to a link type variable stroke engine, and especially relates to a link type variable stroke engine in which, in a crankcase of an engine main body, a crankshaft is rotatably supported, and a rotary shaft is rotatably supported so that power reduced at a speed reduction ratio of 1/2 from the crankshaft is transmitted thereto, the rotary shaft having an axis parallel with the crankshaft and being provided with an eccentric shaft at an eccentric position, and a piston, slidably fitted to a cylinder block of the engine main body, the crankshaft and the eccentric shaft are linked by a linking mechanism, the linking mechanism including: a main connecting rod coupled, at one end, with the piston by using a piston pin; a sub connecting rod rotatably coupled with a crank pin of the crankshaft and rotatably coupled with the other end of the main connecting rod by using a connecting rod pin; and a swing rod rotatably coupled, at one end, with the sub connecting rod by using a swing pin at a position displaced from a position coupled with the main connecting rod and rotatably coupled, at the other end, with the eccentric shaft.

2. Description of the Related Art

Inertial exciting forces, which induce inertial vibration, of a conventional reciprocating engine are only integer order components, i.e., a first order component, a second order component, a third order component . . . , of a rotation speed of a crankshaft. To suppress and lessen first order vibration and second order vibration, such a reciprocating engine includes a first order balancer and a second order balancer which reduce the inertial exciting forces in synchronization with rotation of the crankshaft.

Meanwhile, a link type variable stroke engine has already been known by Japanese Utility Model Publication No. 57-32267, Japanese Patent Application Laid-open No. 9-228858, the specification of U.S. Pat. No. 4,517,931, and the like. In the link type variable stroke engine, a piston, a crankshaft and an eccentric shaft are linked by a linking mechanism, the eccentric shaft provided to a rotary shaft which is parallel with the crankshaft and to which power reduced at a speed reduction ratio of 1/2 from the crankshaft is transmitted. Even in such a link type variable stroke engine, inertial exciting force needs to be suppressed and lessened.

Now, in a link type variable stroke engine, an eccentric shaft is rotated in synchronization with a crankshaft at a speed reduction ratio of 1/2. For this reason, half-order rotational inertial force occurs at the eccentric shaft. However, none of the above-described disclosed Japanese Utility Model Publication No. 57-32267, Japanese Patent Application Laid-open No. 9-228858 nor the specification of U.S. Pat. No. 4,517,931 mentions the half-order rotational inertial force or discloses any method for suppressing and lessening the half-order rotational inertial force. This half-order inertial exciting force is an inertial exciting force having an order which does not occur in the conventional reciprocating engine, and has a frequency which is half of that of the first order vibration, that is, a low frequency. Accordingly, the half-order inertial exciting force is perceived as muffled sound or uncomfortable vibration different from conventional ones, and is thus not preferable from the view point of marketability. In addition, conventional integer order balancers, such as the first order balancer and the second order balancer, do not have an order suitable for the half-order inertial exciting force, and are hence not effective for the half-order inertial exciting force.

For this reason, when the inertial exciting force becomes excessively large and consequently the inertial vibration becomes large, a worker using an apparatus equipped with the link type variable stroke engine, for example, a working machine, feels uncomfortable, the working machine starts to move by itself and thereby grounding performance is deteriorated, and noise attributable to vibration increases, for example. Moreover, an excessive increase in the inertial exciting force may also cause a reduction in the strength of components of the engine.

SUMMARY OF THE INVENTION

The present invention has been made in view of the above-described circumstances. An object of the present invention is to provide a link type variable stroke engine capable of effectively suppressing and lessening half-order inertial exciting force occurring at an eccentric shaft.

In order to achieve the object, according to a feature of the present invention, there is provided a link type variable stroke engine in which, in a crankcase of an engine main body, a crankshaft is rotatably supported, and a rotary shaft is rotatably supported so that power is transmitted at a speed reduction ratio of 1/2 from the crankshaft, the rotary shaft having an axis parallel with the crankshaft and being provided with an eccentric shaft at an eccentric position, and a piston, slidably fitted to a cylinder block of the engine main body, the crankshaft and the eccentric shaft are linked by a linking mechanism, the linking mechanism including: a main connecting rod coupled, at one end, with the piston by using a piston pin; a sub connecting rod rotatably coupled with a crank pin of the crankshaft and rotatably coupled with the other end of the main connecting rod by using a connecting rod pin; and a swing rod rotatably coupled, at one end, with the sub connecting rod by using a swing pin at a position displaced from a position coupled with the main connecting rod and rotatably coupled, at the other end, with the eccentric shaft, wherein a counterweight part is provided so that in a projection view on a plane orthogonal to the axis of the rotary shaft, a center of gravity of the counterweight part is located on an opposite side of the axis of the rotary shaft from an axis of the eccentric shaft, and rotates together with the rotary shaft.

Further, according to a second feature of the present invention, in addition to the first feature, the counterweight part is provided to the eccentric shaft.

Moreover, according to a third feature of the present invention, in addition to the first feature, the counterweight part is provided to a driven ring which constitutes a part of a timing transmitting mechanism provided between the crankshaft and the rotary shaft and which is fixed to the rotary shaft.

According to the first to third features of the present invention, the counterweight part rotates together with the rotary shaft, the counterweight parts provided so that in the projection view on a plane orthogonal to the axis of the rotary shaft, the center of gravity is located on the opposite side of the axis of the rotary shaft from the axis of the eccentric shaft. Accordingly, the direction of half-order inertial exciting force occurring at the counterweight part is opposite from that of half-order inertial exciting force occurring at the eccentric shaft. With this configuration, the half-order inertial exciting force occurring at the eccentric shaft can be suppressed and lessened effectively.

A second timing transmitting mechanism 51B of an embodiment corresponds to a timing transmitting mechanism of the present invention, and a second driven gear 52B of an embodiment corresponds to a driven ring of the present invention.

The above description, other objects, characteristics and advantages of the present invention will be clear from detailed descriptions which will be provided for the preferred embodiments referring to the attached drawings.

BRIEF DESCRIPTION OF THE DRAWINGS

FIG. 1 is a longitudinal cross-sectional side view of an engine and a cross-sectional view taken along a line 1-1 in FIG. 2; and FIG. 2 is a cross-sectional view taken along a line 2-2 in FIG. 1.

FIG. 3 is a longitudinal cross-sectional side view of an engine and a cross-sectional view taken along a line 3-3 in FIG. 4; and FIG. 4 is a cross-sectional view taken along a line 4-4 in FIG. 3.

DESCRIPTION OF THE PREFERRED EMBODIMENTS

A first embodiment of the present invention will be explained below based on FIGS. 1 and 2.

Figure 1:
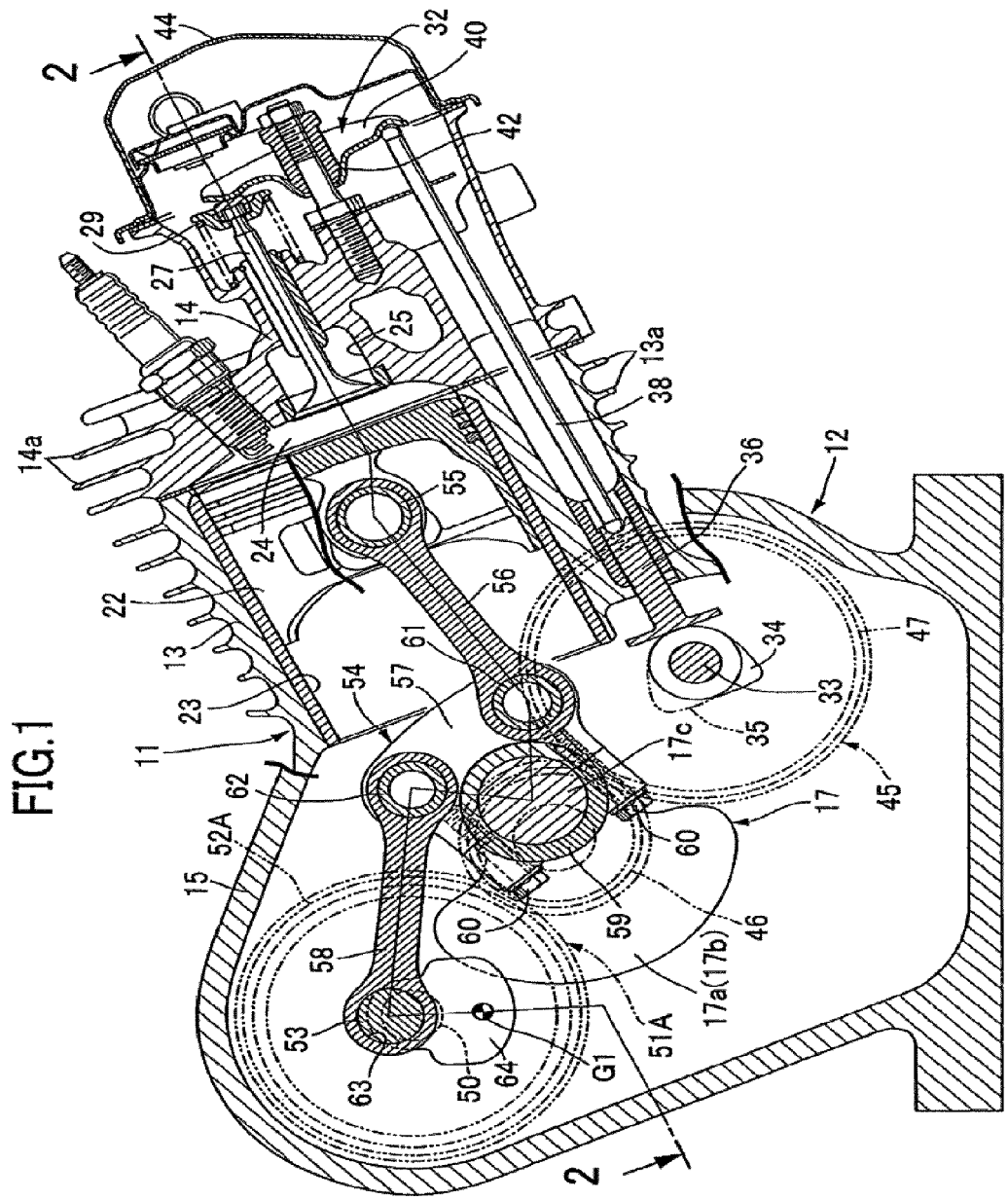
FIGS. 1 and 2 show a first embodiment of the present invention.
Figure 2:
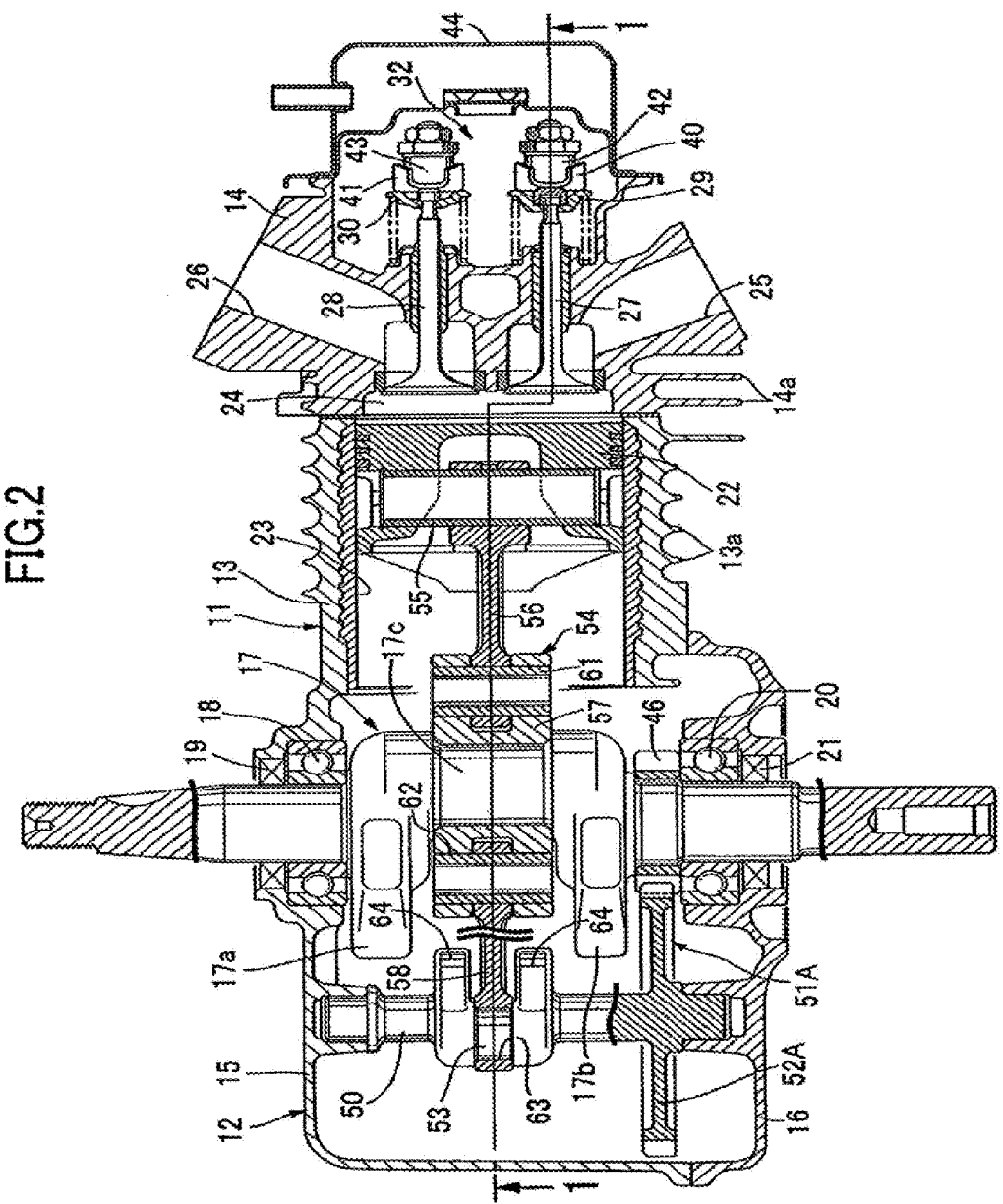

First, in FIG. 1 and FIG. 2, this link type variable stroke engine is an air-cooled single cylinder engine, which is used for working machines and the like, for example. An engine body 11 includes: a crankcase 12; a cylinder block 13 protruding in upwardly tilting manner from one side surface of the crankcase 12; and a cylinder head 14 joined to a head portion of the cylinder block 13. A large number of air-cooling fins 13a and 14a are provided on outer side surfaces of the cylinder block 13 and the cylinder head 14.

The crankcase 12 comprises: a case main body 15 formed integrally with the cylinder block 13 by molding and opened at one side; and a side cover 16 joined to the opened end of the case main body 15. A crankshaft 17 is rotatably supported in the crankcase 12. The crankshaft 17 integrally has a pair of counterweights 17a and 17b, as well as a crank pin 17c which connects between the counter weights 17a and 17b. Accordingly, both end portions of the crankshaft 17 rotatably penetrate the case main body 15 and the side cover 16 of the crankcase 12 and protrude outwardly. A ball bearing 18 and an annular sealing member 19 are disposed between the crankshaft 17 and the case main body 15, the sealing member 19 disposed on the outer side of the ball bearing 18, and a ball bearing 20 and an annular sealing member 21 are disposed between the crankshaft 17 and the side cover 16, the sealing member 21 disposed on the outer side of the ball bearing 20.

A cylinder bore 23 is formed in the cylinder block 13. A piston 22 is slidably fitted in the cylinder bore 23. A combustion chamber 24 is formed between the cylinder block 13 and the cylinder head 14, and a top portion of the piston 22 faces the combustion chamber 24. An intake port 25 and an exhaust port 26, both communicating with the combustion chamber 24, are formed in the cylinder head 14. In addition, an intake valve 27 for opening and closing the passage between the intake port 25 and the combustion chamber 24 as well as an exhaust valve 28 for opening and closing the passage between the exhaust port 26 and the combustion chamber 24 are disposed in the cylinder head 14 so as to be capable of performing the opening and closing operations. The intake valve 27 and the exhaust valve 28 are urged in a valve-closing direction by valve springs 29 and 30, respectively.

A valve operating mechanism 32 opening and closing the intake valve 27 and the exhaust valve 28 includes: a cam shaft 33 including an intake cam 34 and an exhaust cam 35 and rotatably supported at the crankcase 12; an intake tappet 36 supported at the cylinder block 13 so that the intake cam 34 causes the intake tappet 36 to slide up and down following motion of the intake cam 34; an exhaust tappet (not illustrated) supported at the cylinder block 13 so that the exhaust cam 35 causes the exhaust tappet to slide up and down following motion of the exhaust cam 35; an intake push rod 38 continuously connected, at its lower end portion, with an upper end portion of the intake tappet 36 and extending in the up-down direction; an exhaust push rod (not illustrated) continuously connected, at its lower end portion, with an upper end portion of the exhaust tappet and extending in the up-down direction; an intake rocker arm 40 swingably supported by a spherical supporting part 42 fixed to the cylinder head 14; and an exhaust rocker arm 41 swingably supported by a spherical supporting part 43 fixed to the cylinder head 14. One end portion of the intake rocker arm 40 is in contact with an upper end of the intake push rod 38, whereas one end portion of the exhaust rocker arm 41 is in contact with an upper end of the exhaust push rod. The other end portions of the intake rocker arm 40 and the exhaust rocker arm 41 are in contact respectively with head portions of the intake valve 27 and the exhaust valve 28.

The spherical supporting parts 42 and 43 and the intake and exhaust rocker arms 40 and 41 of the valve operating mechanism 32 are covered with a head cover 44, and the head cover 44 is connected with the cylinder head 14.

The cam shaft 33 has an axis parallel with the crankshaft 17. Between the camshaft 33 and the crankshaft 17, first timing transmitting means 45 is provided which transmits the rotation power of the crankshaft 17 at a speed reduction ratio of 1/2. The first timing transmitting means 45 includes: a driving gear 46 fixed to the crankshaft 17; and a first driven gear 47 provided to the cam shaft 33.

Opposite end portions of a rotary shaft 50 are rotatably supported at the case main body 15 and the side cover 16 of the crankcase 12, the rotary shaft 50 having an axis parallel with the crankshaft 17 while having a rotation axis above an axis of the crankshaft 17. Between the rotary shaft 50 and the crankshaft 17, second timing transmitting means 51A is disposed which reduces the rotation power of the crankshaft 17 at a speed reduction ratio of 1/2 and then transmits the rotation power to the rotary shaft 50. The second timing transmitting means 51A comprises the driving gear 46 fixed to the crankshaft 17 and a second driven gear 52A integrally provided to the rotary shaft 50 so as to mesh with the driving gear 46.

An eccentric shaft 53 is provided integrally with the rotary shaft 50 at a position corresponding to a portion between the pair of counterweights 17a and 17b of the crankshaft 17. The eccentric shaft 53 has its axis at a position eccentric with respect to the axis of the rotary shaft 50. The eccentric shaft 53, the piston 22 and the crankshaft 17 are linked by a linking mechanism 54.

The linking mechanism 54 comprises: a main connecting rod 56 coupled, at one end, with the piston 22 by using a piston pin 55; a sub connecting rod 57 disposed between the counterweights 17a and 17b of the crankshaft 17 to be coupled with the crank pin 17c and to be rotatably coupled with the other end of the main connecting rod 56; and a swing rod 58 rotatably connected, at one end, with the sub connecting rod 57 at a position displaced from the coupled position of the main connecting rod 56, and rotatably coupled, at the other end, with the eccentric shaft 53.

The sub connecting rod 57 is formed so as to be in sliding contact with half of the circumference of the crank pin 17c. A crank cap 59 is disposed to be in sliding contact with the other half of the circumference of the crank pin 17c, and is fastened to the sub connecting rod 57 with a pair of bolts 60 and 60.

The other end portion of the main connecting rod 56 is rotatably coupled with the one end portion of the sub connecting rod 57 by using a connecting rod pin 61. The one end portion of the swing rod 58 is rotatably coupled with the sub connecting rod 57 by using a swing pin 62. A circular connection hole 63, which the eccentric shaft 53 penetrates in a relatively rotatable manner, is formed in the other end portion of the swing rod 58.

When the rotary shaft 50 is rotated at a speed reduction ratio of 1/2 along with rotation of the crankshaft 17 and the eccentric shaft 53 thereby rotates about the rotation axis of the rotary shaft 50, the linking mechanism 54 operates, for example, in a manner that the stroke of the piston 22 in the expansion stroke becomes larger than that in the compression stroke. Thus, a higher expansion work is achieved with the same amount of intake of the air-fuel mixture, so that the cycle thermal efficiency can be improved.

In the link type variable stroke engine having the above-described configuration, the eccentric shaft 53 is rotated in synchronization with the crankshaft 17 at a speed reduction ratio of 1/2, and half-order rotational inertial force occurs at the eccentric shaft 53 consequently. In view of this fact, according to the present invention, counterweight parts 64 and 64 rotating together with the rotary shaft 50 are provided respectively at both end portions of the eccentric shaft 53 so that in a projection view on a plane orthogonal to the axis of the rotary shaft 50, centers of gravity G1 of the counterweight parts 64 are located on the opposite side of the axis of the rotary shaft 50 from the axis of the eccentric shaft 53.

Thus, the counterweight parts 64, having the centers of gravity G1 located on the opposite side of the axis of the rotary shaft 50 from the axis of the eccentric shaft 53 in a projection view on a plane orthogonal to the axis of the rotary shaft 50, are provided respectively at two end portions of the eccentric shaft 53 and rotate together with the rotary shaft 50. As a result, a direction of half-order inertial exciting force occurring at the counterweight parts 64 is opposite from that of half-order inertial exciting force occurring at the eccentric shaft 53. Hence, the half-order inertial exciting force occurring at the eccentric shaft 53 can be suppressed and lessened effectively.

Figure 3:
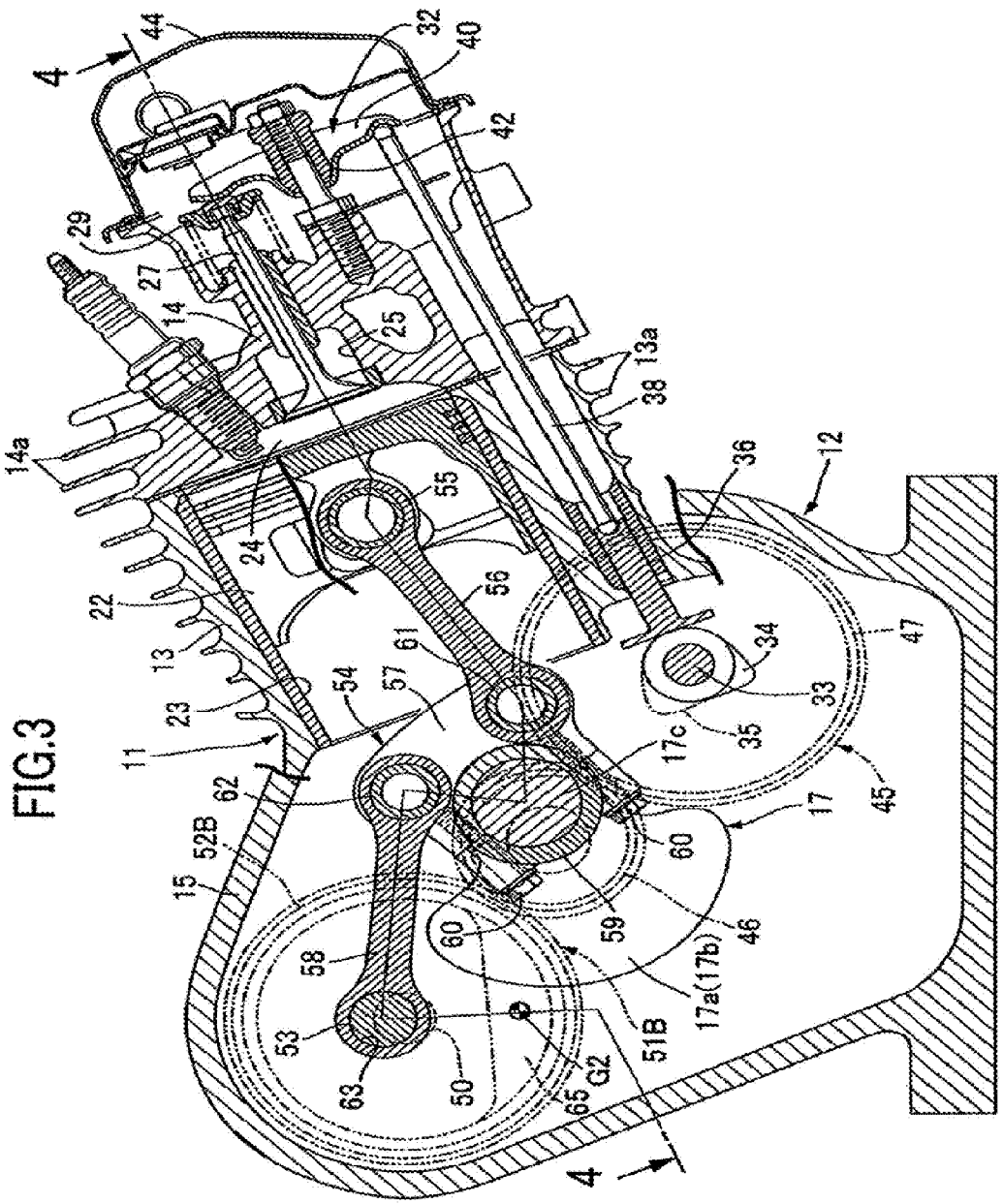
FIGS. 3 and 4 show a second embodiment of the present invention.
Figure 4:
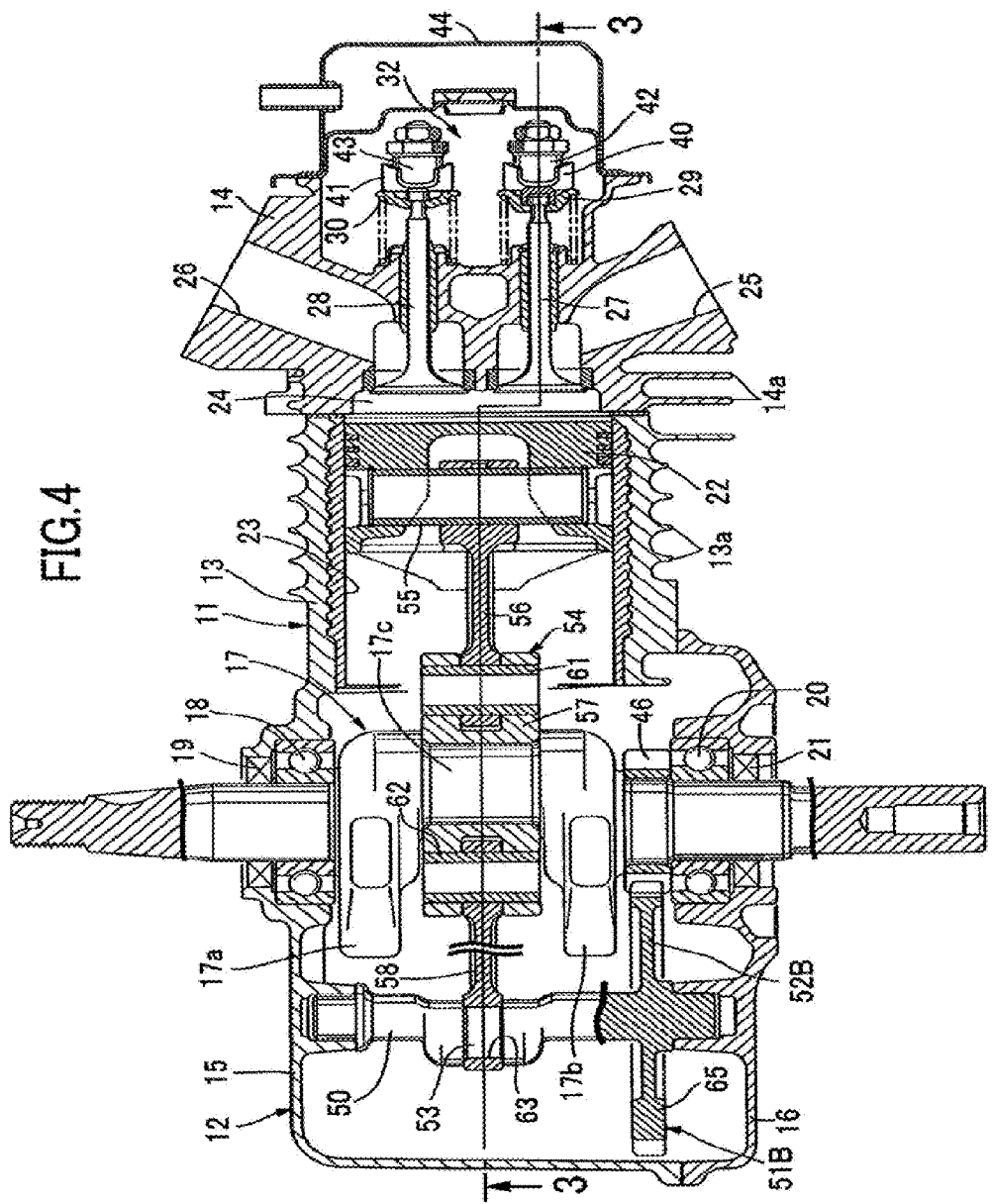

Next, a second embodiment of the present invention will be described on the basis of FIGS. 3 and 4. Here, the components corresponding to those of the first embodiment are simply denoted by the same reference numerals in the drawings and detailed descriptions thereof are omitted.

Between a camshaft 33 and a crankshaft 17 of the valve operating mechanism 32, first timing transmitting means 45 is provided which transmits rotation power of the crankshaft 17 at a speed reduction ratio of 1/2, and between the rotary shaft 50 and the crankshaft 17, second timing transmitting means 51B is provided which transmits rotation power of the crankshaft 17 to the rotary shaft 50 at a speed reduction ratio of 1/2. The second timing transmitting means 51B comprises: a driving gear 46 fixed to the crankshaft 17; and a second driven gear 52B as a driven ring integrally provided to the rotary shaft 50 so as to mesh with the driving gear 46. Counterweight parts 65 are provided to the second driven gear 52B so that in a projection view on a plane orthogonal to the axis of the rotary shaft 50, centers of gravity G2 are located on the opposite side of the axis of the rotary shaft 50 from the axis of an eccentric shaft 53 and rotate together with the rotary shaft 50.

According to the second embodiment, in the same manner as the first embodiment, a direction of half-order inertial exciting force occurring at the counterweight parts 65 is opposite from that of half-order inertial exciting force occurring at the eccentric shaft 53. Hence, the half-order inertial exciting force occurring at the eccentric shaft 53 can be suppressed and lessened effectively.

An embodiment of the present invention is explained above, but the present invention is not limited to the above-mentioned embodiment and may be modified in a variety of ways as long as the modifications do not depart from its gist.

The invention claimed is:

1. A link type variable stroke engine, comprising: an engine main body including a crankcase, a crankshaft is rotatably supported by said crankcase, and a rotary shaft is rotatably supported by said crank case such that power reduced at a speed reduction ratio of 1/2 from the crankshaft is transmitted thereto, the rotary shaft having an axis parallel to the crankshaft and including an eccentric shaft at an eccentric position, a piston slidably fitted to a cylinder block of the engine main body, and a linking mechanism linking the crankshaft and the eccentric shaft, the linking mechanism including: a main connecting rod which is coupled to the piston at a first end of the main connecting rod by a piston pin; a sub connecting rod which is rotatably coupled to the crankshaft by a crank pin, and which is rotatably coupled to a second end of the main connecting rod by a connecting rod pin; and a swing rod which is rotatably coupled to the sub connecting rod at a first end of the swing rod by a swing pin, at a position displaced from the position where said sub connecting rod is coupled to the main connecting rod, and which is rotatably coupled to the eccentric shaft at a second end of the swing rod, wherein a counterweight part is provided so that in a projection view on a plane orthogonal to the axis of the rotary shaft, a center of gravity of the counterweight part is located on an opposite side of the axis of the rotary shaft from an axis of the eccentric shaft, and rotates together with the rotary shaft.

2. The link type variable stroke engine according to claim 1, wherein the counterweight part is provided to the eccentric shaft.

3. The link type variable stroke engine according to claim 1, wherein the counterweight part is provided to a driven ring which constitutes a part of a timing transmitting mechanism provided between the crankshaft and the rotary shaft, the driven ring being fixed to the rotary shaft.

* * * * *